(12) United States Patent
Jacoby et al.

(10) Patent No.: US 7,877,621 B2
(45) Date of Patent: Jan. 25, 2011

(54) DETECTING SOFTWARE ATTACKS BY MONITORING ELECTRIC POWER CONSUMPTION PATTERNS

(75) Inventors: Grant A. Jacoby, West Point, NY (US); Nathaniel J Davis, IV, Dayton, OH (US); Randolph C. Marchany, Blacksburg, VA (US)

(73) Assignees: Virginia Tech Intellectual Properties, Inc., Blacksburg, VA (US); The United States of America as represented by the Secretary of the Army, Washington, DC (US)

( * ) Notice: Subject to any disclaimer, the term of this patent is extended or adjusted under 35 U.S.C. 154(b) by 740 days.

(21) Appl. No.: 11/574,619

(22) PCT Filed: Jun. 24, 2005

(86) PCT No.: PCT/US2005/022744
§ 371 (c)(1),
(2), (4) Date: Aug. 31, 2007

(87) PCT Pub. No.: WO2006/028558
PCT Pub. Date: Mar. 16, 2006

(65) Prior Publication Data
US 2008/0276111 A1 Nov. 6, 2008

(51) Int. Cl.
*G06F 1/32* (2006.01)
*G06F 21/00* (2006.01)
(52) U.S. Cl. .................... 713/340; 713/300; 726/24; 726/25
(58) Field of Classification Search ............... 713/300, 713/310, 340; 726/22, 23, 24, 25
See application file for complete search history.

(56) References Cited

U.S. PATENT DOCUMENTS

| 5,248,967 A | 9/1993 | Daneshfar ............... 340/931 |
| 6,625,737 B1 | 9/2003 | Kissell .................... 713/300 |
| 7,587,044 B2 * | 9/2009 | Kocher et al. ................ 380/1 |
| 2004/0054924 A1 | 3/2004 | Chuah et al. ............... 713/201 |
| 2006/0001402 A1* | 1/2006 | Kim et al. ................. 320/132 |
| 2006/0090081 A1* | 4/2006 | Baentsch et al. ........... 713/189 |

* cited by examiner

*Primary Examiner*—Dennis M Butler
(74) *Attorney, Agent, or Firm*—Whitham Curtis Christofferson & Cook, PC

(57) ABSTRACT

Software attacks such as worms and viruses are detected in an electronic device by monitoring power consumption patterns. In a first embodiment, software attacks are detected by an increase in power consumption. The increased power consumption can be caused by increased network traffic, or by increased activity in the microprocessor. Monitoring power consumption is particularly effective for detecting DOS/flooding attacks when the electronic device is in an idle state. In a second embodiment, a power consumption signal is converted to the frequency domain (e.g., by fast Fourier transform). The highest amplitude frequencies are identified. Specific software attacks produce characteristic frequencies in the power consumption signal. Software attacks are therefore detected by matching the highest amplitude frequencies with frequencies associated with specific worms and viruses. Identification of a particular software attack typically requires matching of 3 or more of the highest amplitude frequencies, and, optionally, amplitude information.

32 Claims, 7 Drawing Sheets

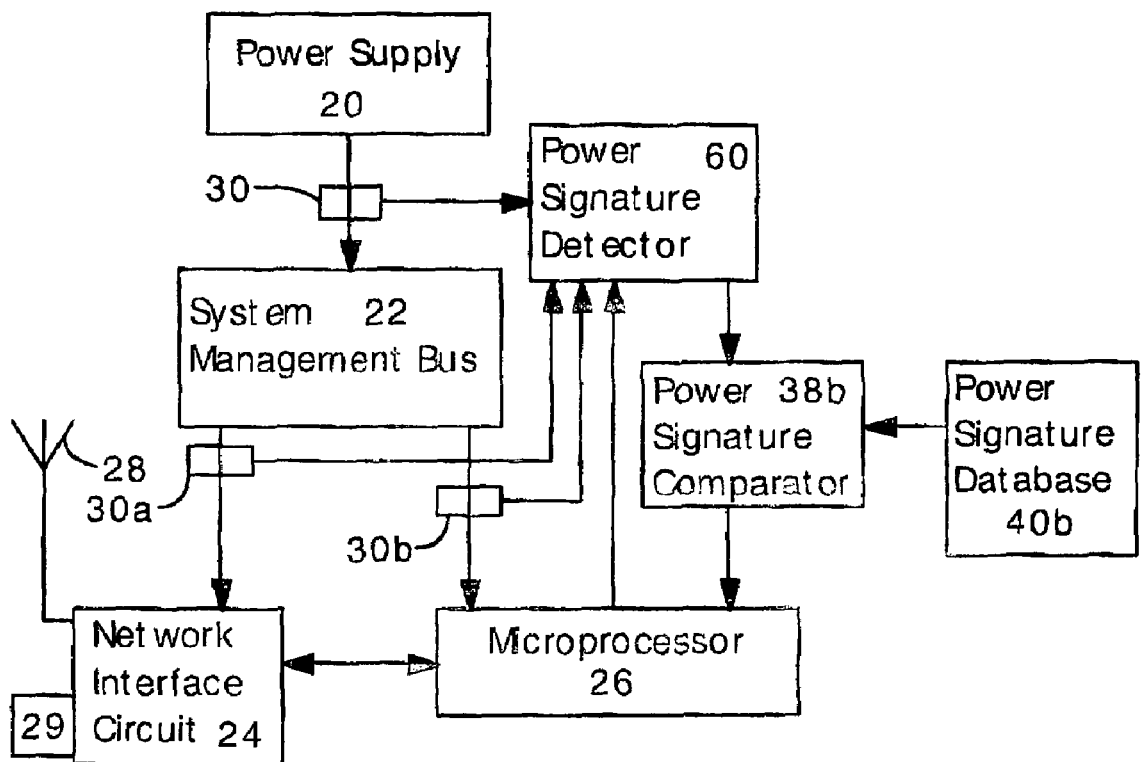
Fig. 9
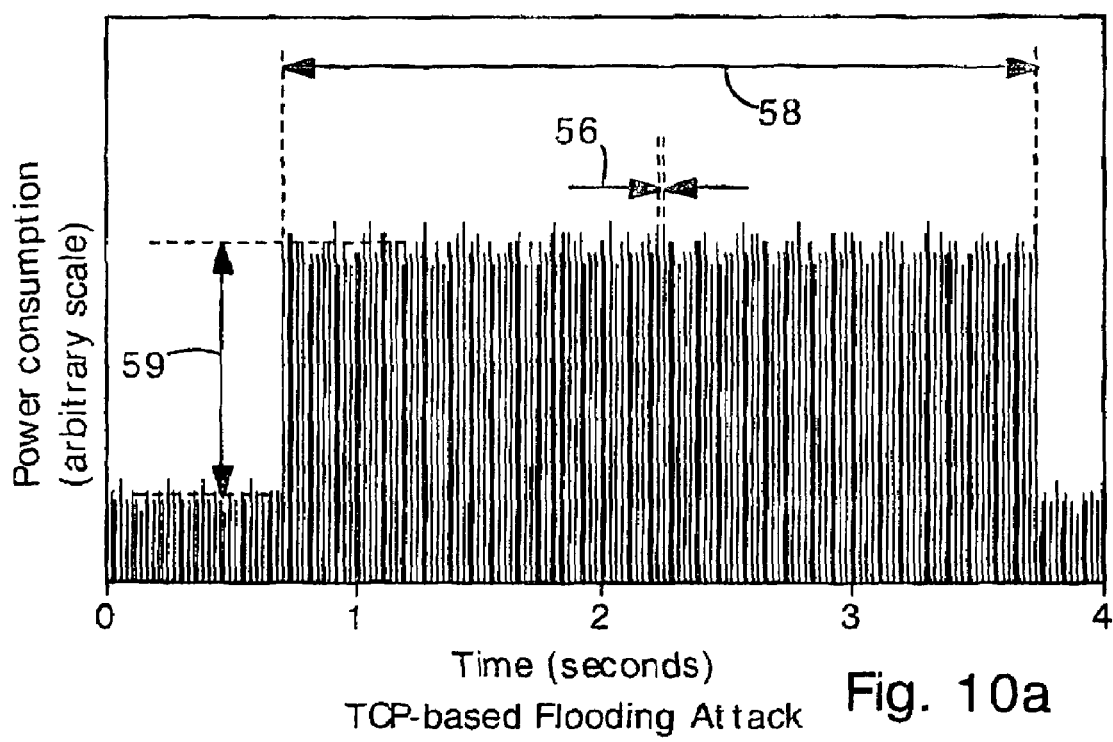
TCP-based Flooding Attack    Fig. 10a

UDP-based Flooding Attack

UDP-based Flooding Attack

DETECTING SOFTWARE ATTACKS BY MONITORING ELECTRIC POWER CONSUMPTION PATTERNS

FIELD OF THE INVENTION

The present invention relates generally to security for computerized devices. More particularly, the present invention relates to detecting malicious software (e.g., worms, viruses) by monitoring power consumption patterns (e.g., current versus time as well as the amplitude and frequency spectrum of power consumption). The present invention is particularly well suited for use in protecting mobile, battery-powered devices (e.g., PDAs, cell phones, laptop computers) from malicious software attacks.

BACKGROUND OF THE INVENTION

Viruses and worms are well known threats to computer networks and the computers on those networks. Such malicious software impairs computer performance and is costly to monitor and remove. Many large institutions spend millions of dollars to protect their computer systems from viruses, worms, and other forms of software attacks.

Portable computing devices (e.g., personal digital assistants (PDAs), cell phones, and laptop computers) are becoming more common and are increasingly the targets of malicious software attacks. Portable devices are particularly susceptible when they are linked via a wireless network. Wireless networks can facilitate rapid propagation of malicious software because portable devices can form temporary wireless links with many other devices. New links can be easily and rapidly established with infected devices that can, in turn, infect other devices. With cell phones and other portable devices having increased messaging functionality and connectivity to wireless networks, the potential for viruses and worms to infect such portable devices and cause damage is increasing rapidly.

In fact, malicious viruses and worms specifically designed for infecting portable devices have already been created. In June, 2004 the first widespread worm attack against wireless networks appeared. The Cabir worm, once activated in a mobile device, instructs the device to constantly search for any nearby Bluetooth-enabled devices. When a Bluetooth device is found, the Cabir worm sends a copy of itself to this device, and then continues to propagate to any other devices connected to the Bluetooth network. The Cabir worm is damaging in that it creates unnecessary network traffic and greatly increases the power drain on the infected devices as a result of constant searching for other Bluetooth devices.

Using conventional techniques, portable devices and wireless networks can be difficult to protect from malicious code. Conventional techniques for protecting a computer system from software attacks, such as antivirus programs and firewalls, typically employ a scanning function to detect known malicious code. All downloaded or executed code or network message packets are scanned for instructions or other "signatures" known to be present in worms or viruses. This technique is problematic when employed in portable devices because it can greatly increase power consumption and thereby reduce battery life. Also, scanning for malicious code can significantly reduce the performance of the microprocessors found in portable devices, since portable devices typically have relatively limited processing capability.

There is a need in the art for a system and method for detecting malicious software attacks. It would be particularly advantageous to detect software attacks in a manner that does not significantly increase battery drain or overload the microprocessor. A low-power, reliable, and simple detection method would be particularly applicable for use in wirelessly networked portable electronic devices.

SUMMARY OF THE INVENTION

The present invention includes an information processing device capable of detecting undesired software operation (e.g., software attacks, worms or viruses). The device includes a sensor (e.g., current sensing resistor) for detecting an amount of electrical power or current consumed by the device. Also, the device includes a threshold detector for comparing the amount of detected electrical power to a threshold value. If the detected electrical power consumption is higher than the threshold value, then it is likely that undesired software is operating, and an alert can be sent to the user, microprocessor or network administrator.

The device may include a network interface circuit (NIC) and a microprocessor. The sensor can detect an amount of power flowing to the NIC and microprocessor individually (i.e., the NIC and microprocessor can each have an associated sensor).

The present invention also includes a method for detecting undesired software operation, which includes the steps of detecting an amount of electrical power consumed by the electronic device, and then comparing the detected electrical power consumption with a threshold value. If the electrical power consumption is higher than the threshold value, then undesired software may be present. The user, microprocessor or network administrator can then be alerted that undesired software is or may be present.

The electrical power consumption can be detected periodically (e.g., once per second).

The threshold value can be adjusted in response to changes in the operating mode. For example, the threshold value can be reduced when the electronic device enters a sleep or idle mode.

The present invention also includes an electronic device capable of detecting undesired software operation by detecting frequency signatures associated with undesired software. The electronic device includes a sensor (e.g., a current sensing resistor) for detecting a power consumption signal indicating power consumed by the device, and a detector for detecting a frequency signature of the power consumption signal. The frequency signature typically comprises the frequencies and amplitudes of the highest amplitude frequency components. Finally, the device includes a comparator for comparing the detected frequency signature with a database of frequency signatures associated with undesired software. Typically, a frequency signature is unique for each type of software attack.

The device may also include a buffer for storing the power consumption signal from the sensor, such that the detector can calculate a frequency signature using past power consumption data.

The frequency signature may or may not include amplitude information. Including amplitude information makes the frequency signature more specific.

The detector may detect a frequency signature of each of the NIC and microprocessor.

The detector and comparator functions can be performed in the microprocessor (e.g., using software instructions).

The present invention also includes a method for detecting undesired software operation by detecting frequency signatures of the undesired software. In the present method, a frequency signature of a power consumption signal representative of power consumed by the device is detected. The detected frequency signature is then compared to a database of frequency signatures associated with known undesired software. If a match is found, then the user, microprocessor or network administrator can be alerted that undesired software is present. The type of software can also be identified.

Preferably, the frequency signature includes amplitude information for each frequency component.

The frequency signature is preferably detected by discriminating against all frequencies having amplitudes less than a predetermined confidence threshold. In a specific embodiment, the threshold is a 99% confidence threshold that is calculated by well known standard deviation tests, such as Chi-Squared and Monte Carlo trials.

Preferably, each frequency signature has at least 3 frequency components. Preferably, each frequency component has an amplitude greater than the predetermined confidence threshold.

In another aspect of the invention, the frequency signatures of the network interface circuit or the microprocessor are detected individually.

The present invention also includes an electronic device capable of detecting a type of communication protocol used in an attack (e.g. such as a network flooding attack). The device has a sensor for detecting power consumption by the device. The sensor can detect total aggregate power consumption of the device, or power consumption by individual components of the device (e.g. a network interface card or microprocessor). The device has a comparator for comparing a power consumption signature (in the time domain) with a database that associates power consumption signatures with types of communication protocols. Finding a match between a detected power consumption signature and a signature in the database allows the identification of the type of communication protocol. The comparison can be performed manually, or by a computer, for example. The power consumption signature preferably tracks only long duration changes in power consumption patterns.

The device can also include hardware or software for smoothing the power consumption signal. For example, low pass filtering or peak-tracking (tracking only the peaks of power consumption spikes) can be performed.

Preferably, the database includes data associating a Transmission Control (TC) protocol with a power consumption signal having a single plateau without lulls (periods of low power consumption). The database preferably also includes data associating a Universal Datagram (UD) protocol with a power consumption signal having a long plateau followed by at least one shorter plateau and a lull.

The present invention also includes a method for identifying a type of communication protocol in an electronic device. A power consumption signature is detected. The power consumption signature may detect power consumed by the entire device, or by individual components (e.g. network interface card or microprocessor) of the device. Then, the power consumption signature is compared to a database of power consumption signatures associated with types of communication protocols. If a match is found, then the user, microprocessor or network administrator can be alerted as to the type of communication protocol that is being used.

The comparison step can be performed manually. The database can comprise printed materials (e.g. a reference book).

The power consumption signature can be smoothed to eliminate short duration (e.g. less than 25, 50, or 100 milliseconds) changes in power consumption The communication protocol can be identified as a Universal Datagram (UD) protocol if the power consumption signal includes a long plateau followed by a plurality of alternating short plateaus and lulls. The communication protocol can be identified as a Transmission Control (TC) protocol or Internet Control Message (ICM) protocol if the power consumption signal consists of a single plateau without a lull.

DESCRIPTION OF THE FIGURES

FIG. 9 shows a device with components for capturing power consumption signatures that can be used to identify the type of protocol used in a network attack.

FIGS. 10a and 10b show power consumption signatures in the time domain for intense network flooding attacks based on TC protocol and UD protocol, respectively.

DETAILED DESCRIPTION OF THE PREFERRED EMBODIMENTS

The present invention provides an apparatus and associated method for detecting malicious software attacks (e.g., worms, viruses) in information processing electronic devices (e.g., PDAs, computers, laptop computers, cell phones, music players, video players, etc). The present invention is particularly well suited for use in portable devices that operate with a limited power budget (e.g., battery-powered devices), devices that communicate via a wireless network, and devices that have a relatively limited amount of processing capability.

In the present invention, electrical power consumption is monitored for patterns characteristic of software attacks. The present inventors have discovered that worms, viruses and other forms of software attacks can be detected by unusually high power consumption. In a first embodiment of the invention, power consumption is periodically compared to a threshold level indicative of a software attack. If power consumption is higher than the threshold for a prolonged period, then the user or microprocessor can be alerted that a software attack is probably occurring. Other, more detailed and powerful (and power consuming) antivirus tools can then be applied, if desired.

The present inventors have discovered that downloading or execution of software results in power consumption having frequency components indicative of the software. In a second aspect of the present invention, a power or current consumption signal is converted to the frequency domain, and the most powerful frequency components are identified. If frequency components associated with software attacks are present, then the user or processor is notified of the presence of a software attack. This method of malicious software detection is fast, sensitive and specific.

In another aspect of the present invention, power consumption is monitored in the time domain for characteristic patterns of different types of flooding attacks. Typically, when monitored for a relatively long time period (e.g. about 0.5-4 seconds), and when high frequency components are ignored, the power signal reveals patterns indicative of the protocol used in the attack. Accordingly, the protocol used in the attack (e.g. TCP, UDP, or ICMP) can be identified.

Power Consumption Monitoring

Figure 1:
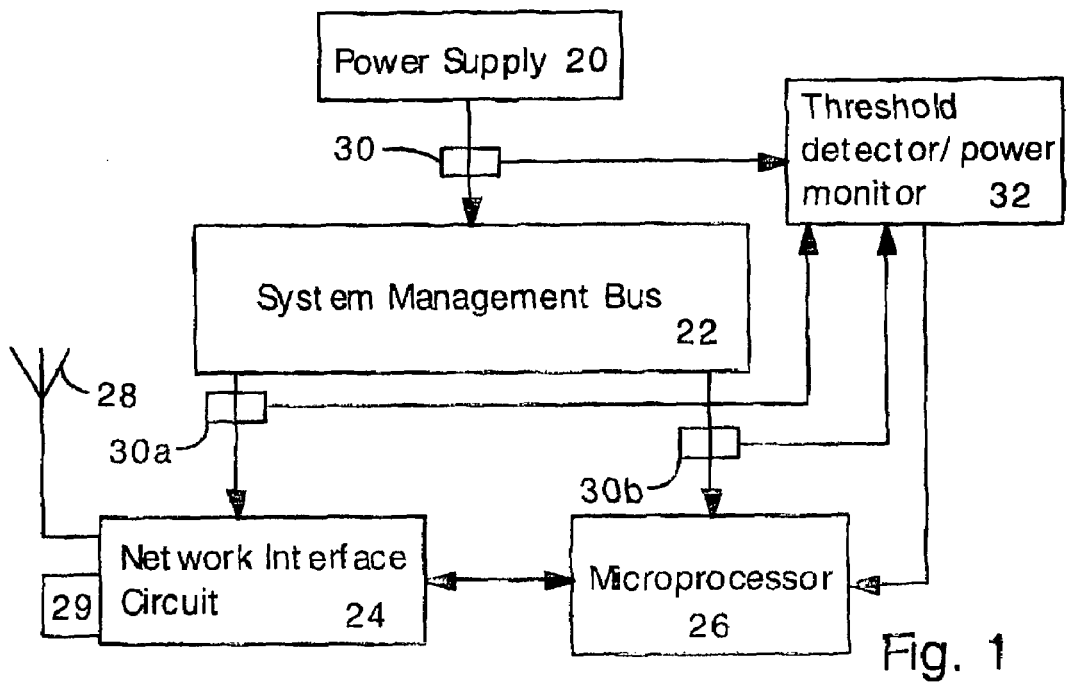
FIG. 1 shows a schematic diagram of an information processing electronic device according to the present invention capable of detecting software attacks by power consumption monitoring.

FIG. 1 shows a schematic view of an information processing electronic device capable of detecting undesired software according to the present invention. The device includes a power supply 20, a system management bus 22, a network interface circuit (NIC) 24, a microprocessor 26, an antenna 28, and a network connector (e.g., Ethernet connector) 29. In the present invention, a sensor 30 is connected to the power supply 20 for monitoring the power or current flowing from the power supply. Power consumption data from the sensor is received by a power monitor 32. Additional sensors 30a and 30b may be provided to sense power or current flowing specifically to the network interface circuit 24 or microprocessor 26.

FIG. 1 is simplified, and shows only the components necessary for understanding the present invention. Other components such as a display, memory, keypad, I/O interface, speakers, microphone, disc drive and the like can be included but, for brevity, are not shown. Similarly, additional sensors can be used to sense power consumption in these other components, as desired.

The power supply 20 can be a battery or a line-powered regulated power supply circuit operating from 120VAC. The power supply typically will provide regulated DC voltage.

The system management bus 22 distributes electrical power to the NIC 24 and microprocessor 26. The bus 22 may also distribute power to other components not shown (e.g., memory), and may perform other functions such as data traffic handling.

The network interface circuit 24 handles data traffic between the present device, and other electronic devices connected to the network. The network interface circuit can communicate wirelessly via the antenna 28, or communicate over a conventional wired network (e.g., Ethernet cable) via the connector 29. In either case, the NIC handles data traffic in and out of the device. In some devices, the NIC may comprise two distinct circuits that separately handle wireless and wired communications. Also, it is noted that the device can comprise more than one NIC 24.

The microprocessor 26 can be any conventional processor that handles computing functions in the device. Typically, two-way data traffic exists between the NIC 24 and microprocessor 26 when the device is connected to a network. The device can comprise more than one microprocessor 26.

The sensors 30 30a 30b can be any kind of power or current sensor such as a Hall effect sensor, piezoelectric/magnetostrictive composite magnetic field sensor, Rogowski coil, or low-resistance precision current sensing resistor. Sensor 30 senses power or current flowing to the bus 22, which may include power or current flowing to device components other than the NIC 24 and microprocessor 26. Sensor 30 may be located to detect the total amount of power consumed by the entire device (including display, keyboard, etc). However, it is important to note that, in the present invention, the power flowing to the NIC 24 and microprocessor 26 are the most important for detecting undesired software. This is because the power consumption characteristics of the NIC 24 and microprocessor 26 are typically the most sensitive to software attacks and network traffic. Sensors 30a 30b are optional, and can be used to sense power flowing to the NIC 24 and microprocessor 26 individually. It is noted that if sensors 30a 30b are employed, then sensor 30 may be unnecessary.

In the present specification and appended claims, little distinction is made between power and current. References to power sensing and current sensing are understood to be interchangeable and nonexclusive. Since the power supply 20 is typically constructed to provide a regulated voltage output, current and power are approximately proportional.

The power monitor 32 monitors the power or current flowing through the sensors 30 30a 30b. Preferably, the power monitor 32 detects the power flow in a pulsed fashion at timed intervals so that power consumption by the power monitor 32 is minimized. For example, the power monitor 32 may instantaneously detect the power flow at a sampling rate of once every 0.5, 1, or 2 seconds. The power monitor may include a memory for storing a recent history of power consumption data. Alternatively, the power monitor may monitor the power consumption continuously, though this will itself consume a significant amount of power.

Although the power monitor and threshold detector 32 are illustrated as a single discrete component, they can be implemented as software operating on the microprocessor 26. For example, the microprocessor 26 can be provided with data indicating the power consumption, and threshold detection can be performed by software in the microprocessor.

Figure 2:
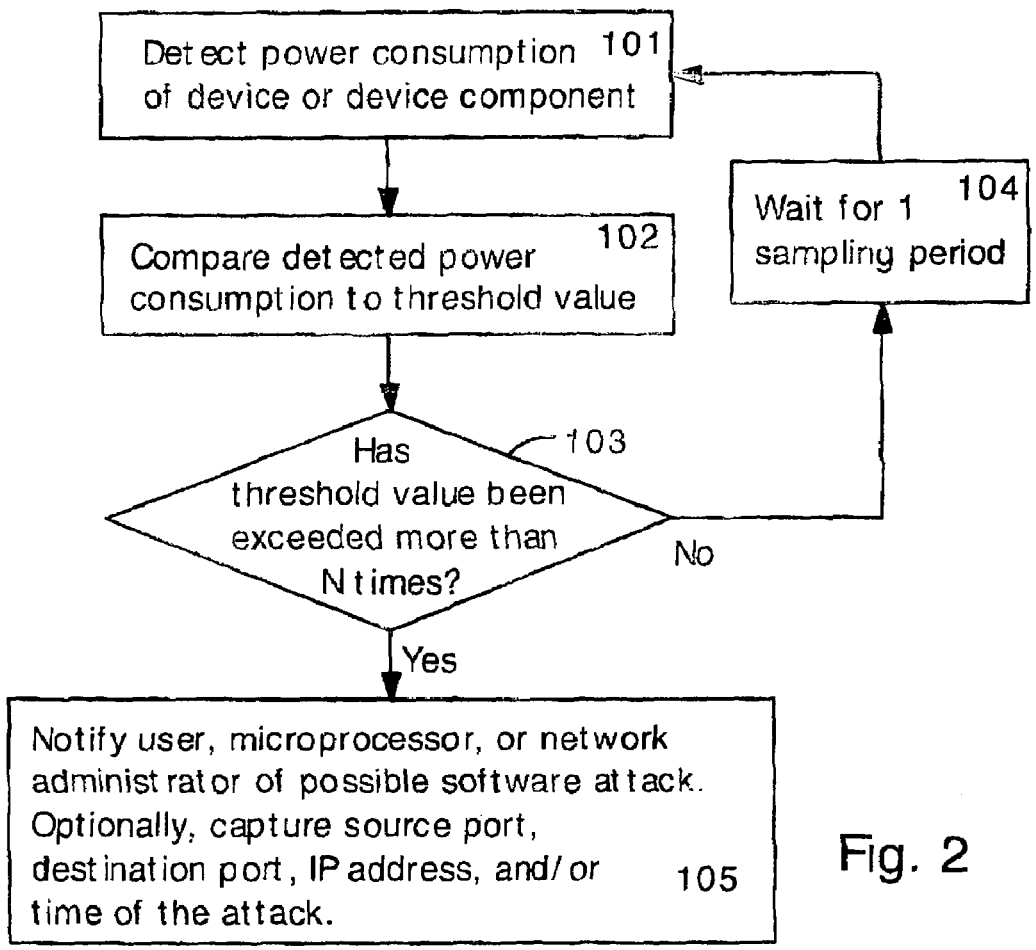
FIG. 2 shows a flow chart illustrating a first embodiment of the present invention, in which undesired software operation is detected by monitoring the device or device components for unusually high power consumption.

FIG. 2 shows a flow chart illustrating the present power consumption monitoring method. The steps are described below:

Step 101: The method is initiated, and the power consumption of the device or individual device component (e.g., NIC 24 or microprocessor 26) is detected. The power consumption measurement may be instantaneous or may be averaged over a short period of time (less than one sampling period).

Steps 102/103: The detected power is compared to a threshold value. Preferably, the threshold value is variable and depends on factors such as the operating mode of the device (e.g., idle or busy), the number and type of software applications presently operating, past history of power consumption patterns, user concern about possible undetected software attacks or other factors that affect normal operating power consumption or the tolerability of false positive events and undetected attacks. Preferably in the present method, several consecutive above-threshold measurements are required before any action or notification occurs. Typically, the user or network administrator can specify the number of above threshold measurement periods, N.

Step 104: The sampling period is widely variable, but will typically be in the range of about 0.5-40 seconds.

Step 105: If the detected power consumption is higher than the threshold level for an extended period of time (e.g., several consecutive sampling periods, or several seconds), then preferably the user or microprocessor can be notified that excessive power consumption is occurring, or that malicious software might be operating. The user can be offered a menu of several responsive actions. For example, the user may choose to activate antivirus software, or perform other operations. The user may choose to ignore the alert in case the user is aware of a non-threatening cause for the excessive power consumption.

Additionally, other actions can be taken in response to the unusual level of detected power consumption. For example, an analysis of microprocessor utilization for each process can be performed. Information about microprocessor utilization can be helpful for determining if an attack is really occurring, and/or identifying the attack. Similarly, the use of network ports can be correlated to processes executing in the microprocessor in order to identify possible abnormal behavior. If an unknown or suspicious process is observed to require large amounts of processor utilization, then that behavior might be caused or influenced by an attack.

The number of sampling periods required for notification (N) can be in the range of 1-50, for example. The number of sampling periods N can be adjustably set by the user or set by a network administrator, and can be adjusted for different operating environments (e.g., adjusted lower for operation in an environment within a heavily infected network). Also, the number of sampling periods N can be adjusted for each operating mode. For example, 10 consecutive above-threshold sampling periods may be required during busy mode, and 5 above-threshold sampling periods may be required during idle mode.

Alternatively, the power monitor 32 may average several consecutive power consumption measurements. In this case, the power monitor 32 may trigger an action if the average power consumption exceeds the threshold value.

The threshold value is set slightly higher (e.g., 5, 10, 15 or 20% higher) than a normal power consumption level. The normal power consumption level typically will depend on the operating mode (e.g., idle mode or busy mode). Hence, the threshold level will change when the device changes between idle and busy operating modes. The device may also have 3 or more operating and sleep modes, each with its own established threshold level. Each time the device changes to a new operating state, the power monitor 32 should be notified so the threshold level can be changed.

Preferably, the device does not take any action without the notification and consent of the user. This is because many user-initiated actions can cause an unusual increase in power consumption. Alternatively, the user can choose to have the microprocessor 26 take action (e.g., initiate antivirus software) without prior approval from the user.

The user can be notified by an audible sound or by a special screen icon. In response, the user can initiate antivirus software, notify a network administrator, or perform other actions to limit possible damage to stored data or identify the type of software causing the problem. For example, more sophisticated and power consumptive antivirus software can be activated such as scanning software for detecting and deleting malicious software. Also, data can be collected on the network source port, network destination port, IP address, and time of the attack. This type of data can be useful to a network administrator attempting to stop the propagation of a virus. Alternatively, in response to an excessive power consumption level, the microprocessor 26 may request these actions from the user.

The threshold level can be set according to a prior history of patterns of power consumption for a particular user and for a particular set of application programs. For example, software supporting the present method can monitor over a period of hours, days or weeks the average and peak levels of power consumption when certain application programs are operating. The threshold level can then be set slightly higher than the peak power levels. Alternatively, the present method may rely on machine learning or other software learning techniques to establish an appropriate threshold level that minimizes both false alarms and undetected software attacks. Of course, when establishing customized, history-based threshold settings, the threshold levels should be established at times when it is known that malicious software is not present in the device (i.e. when the device is uninfected and not under attack).

Also, it is noted that the threshold level can be adjusted (e.g., upwardly) when application programs are loaded. Increasing the number of operating application programs will typically increase the power consumption level, and therefore the required threshold level. The threshold level can also be adjusted to accommodate changes in network traffic or network connectivity (e.g., more power may be required if the device is moved away from the network and must transmit using a higher radio frequency power).

Also, it is noted that the threshold level may be adjusted by the user. This may be necessary at times when the user is performing tasks known to the user to require increased power consumption.

The present power monitoring method is particularly effective for detecting denial of service (DOS) or flooding attacks. This is because DOS/flooding attacks result in a large amount of network traffic and processor activity, which tends to greatly increase power consumption in both the NIC 24 and microprocessor 26. DOS and flooding attacks are particularly easy to detect if they occur while the device is in a low power (e.g., idle) mode.

It is important to note that the present power monitoring method tends to be more effective when the device is in an idle mode or other low-power mode. When in a low-power mode, the device consumes a relatively small and consistent amount of power, and, consequently, small increases in power consumption caused by a software attack can be more easily detected. In general, lower quiescent power consumption will render the present method more effective with reduced false alarms, and reduced undetected attacks. In experiments performed by the present inventors, the present method was able to detect nearly 100% (typically >90%) of DOS attacks when in the idle mode. In a busy mode, detection of DOS attacks can fall to 50% or 30% or lower, depending on the type and duration of the attack. These experiments were performed with several different kinds of personal digital assistant devices (PDAs).

The present power-monitoring technique of malicious software detection will detect many different kinds of malicious software. For example, the Cabir worm, as noted above, propagates by scanning for Bluetooth-enabled devices. This scanning activity will cause a suspicious increase in the power consumption of the NIC 24, which will be detectable according to the present power monitoring method. It is noted that the scanning activity might not cause a noticeable increase in the power consumption of the microprocessor 26 or other device components. The present power monitoring method is particularly well suited for detecting viruses and worms that cause a large increase in wireless communication activity.

In portable devices, it is critically important to detect malicious software without significantly increasing power consumption and thereby reducing battery lifetime. In experiments performed by the present inventors, battery lifetime (i.e., from 100% to 40% capacity) was compared for several software-based methods of malicious software detection (the commercially available Tigerserve, Airscanner Firewall, and PhatNet software packages), and the present power monitoring method. The Tigerserve, Airscanner Firewall, and PhatNet software packages detect malicious software according to well known code scanning techniques. Averaged results of three trials are provided in Table 1.

TABLE 1

| Detection method | Average battery lifetime | Percentage decrease in battery lifetime |
| --- | --- | --- |
| None | 85.4 minutes | — |
| Present power monitoring method | 84 minutes | 1.6% |
| TigerServe | 81 minutes | 5.2% |
| Airscanner Firewall | 80.4 minutes | 5.9% |
| PhatNet | 77.4 minutes | 9.4% |

From these results it is clear that the present power monitoring method requires a very small amount of power compared to commercially available code-scanning antivirus software packages.

Frequency Spectrum Monitoring

In a second aspect of the present invention, power consumption signals are converted to the frequency domain, and frequency components are used to identify a software attack. Amplitude information for each frequency component can also be used for identification.

Figure 3:
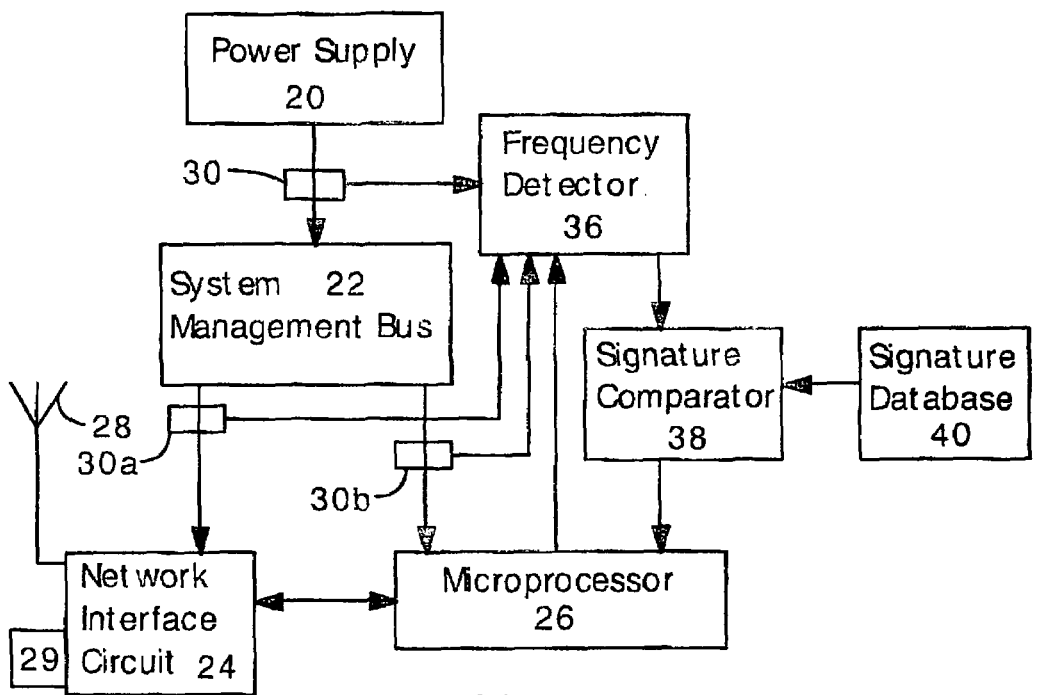
FIG. 3 shows a schematic diagram of an information processing electronic device according to the present invention capable of detecting software attacks by detecting frequencies characteristic of software attacks.

FIG. 3 illustrates an electronic device capable of detecting undesired software according to a second embodiment of the present invention employing frequency detection. The device includes the power supply 20, the system management bus 22, the network interface circuit (NIC) 24, the microprocessor 26, the antenna 28, the network connector (e.g., Ethernet connector) 29, and sensors 30 30a 30b.

Sensors 30a 30b are optional and may be eliminated, so that only sensor 30 is present. Alternatively, sensor 30 can be eliminated so that only sensors 30a 30b are present. Alternatively, only a single sensor 30a or 30b is included. As noted above, sensors 30 30a 30b can be any kind of power or current monitoring sensor.

The electronic device includes a frequency detector 36, a signature comparator 38, and a signature database 40. The frequency detector 36 determines the highest amplitude frequency components in signals received from the sensors 30 30a 30b. The signature comparator 38 receives data from the frequency detector, and compares the received data with data stored in the signature database 40. The comparator 38 alerts the microprocessor 26 if a software attack is detected, and, optionally, if an attack is detected, the type of attack.

In operation, the frequency detector receives analog (time domain) power consumption signals from the sensor 30, and/or sensors 30a 30b and converts the power consumption signals to the frequency domain. Preferably, the frequency detector 36 includes a circuit for performing a fast Fourier transform calculation on the power consumption signals. The frequency detector identifies the highest amplitude frequencies present in the power consumption signals. The group of the highest amplitude frequencies comprises a frequency signature. For example, a frequency signature may simply be a listing of the highest amplitude frequencies detected (e.g., the set 299.85 Hz, 359.82 Hz, 417.29 Hz, and 542.23 Hz). Typically, a frequency signature comprising at least 3 frequencies is uniquely associated with a set of software instructions or software attack (e.g., virus or worm). A frequency signature comprising at least 4 frequencies is generally preferred. A frequency signature may also include amplitude information for each frequency component (e.g., the set 299.85 Hz/−23 dB, 359.82 Hz/−19 dB, 417.29 Hz/−18 dB, and 542.23 Hz/−21 dB).

The frequency detector 36 determines a frequency signature for a particular power consumption signal (e.g., typically having a duration of 100-1000 milliseconds). The frequency signature information is transmitted to the signature comparator 38. The signature comparator compares the received signature with a database of signatures stored in the signature database 40. The signature database stores frequency signatures for many different kinds of worms, viruses and other software attacks. If the comparator determines that a match exists between the received frequency signature and a signature stored in the database 40, then the comparator alerts the microprocessor 26 that a software attack has occurred or is occurring. Preferably, the comparator 38 also provides an identification of the particular virus or worm that created the attack. The identification can be based on the frequency signature since frequency signatures will typically be unique for each type of attack.

Although the frequency detector 36 and signature comparator 38 have been illustrated as separate components, this is not necessarily the case in the present invention. The frequency detector 36 and signature comparator 38 can be implemented as software executed on the microprocessor 26. Alternatively, the detector 36 and comparator can be implemented as application-specific integrated circuits (ASICs), as well known in the art. The signature database 40 can be stored on a hard drive or other memory device (not shown).

Figure 4:
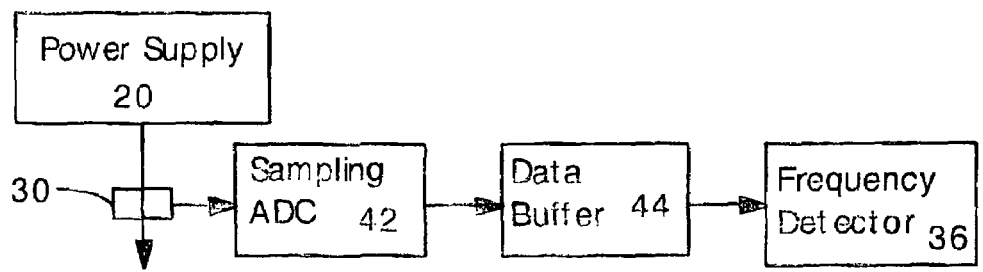
FIG. 4 shows a preferred circuit for capturing power consumption signals.

FIG. 4 illustrates a preferred circuit for processing the power consumption signal. An analog to digital converter (ADC) receives the raw, analog power consumption signal, and converts it into a digital power consumption signal. Then, the digital power consumption signal is stored in a buffer 44. The buffer preferably stores the most recent 25-500 milliseconds of power consumption signal data. The frequency detector 36 can request data stored in the buffer 44 at any time. The buffer thereby allows the frequency detector to retroactively determine a frequency signature of a past power consumption signal or past power consumption event.

It is noted that for most present day electronic devices and most kinds of software attacks, the frequency signature will comprise frequencies of less than about 1 Khz. Other, higher frequency components will exist, but typically will have very low amplitude and therefore will not be useful for attack detection. Accordingly, the ADC 42 will typically not need to be able to resolve the higher frequency components. In order to resolve frequencies up to about 1 Khz, the ADC should sample the power consumption signal at a rate of at least about 2 Khz, as well known in the art of digital signal processing. It is noted that some devices, however, tend to produce frequency signatures with components of relatively high frequency. For example, some personal data assistants (PDAs) may produce frequency signatures with frequencies above 2000 Hz, 3000 Hz, or 4000 Hz. In such devices, the ADC must be able to sample fast enough to resolve the highest frequencies present in the frequency signature. To detect these high frequency components, the ADC 42 may sample the power consumption signal at a higher rate of 5 or 10 Khz, for example.

Future electronic devices may have power consumption signals with distinctive high amplitude components above 5 or 10 Khz. Such high frequency signals may reveal important information about software being executed in the device. The present invention is not limited to analysis of low frequency (<1 Khz) signals.

Figure 5:
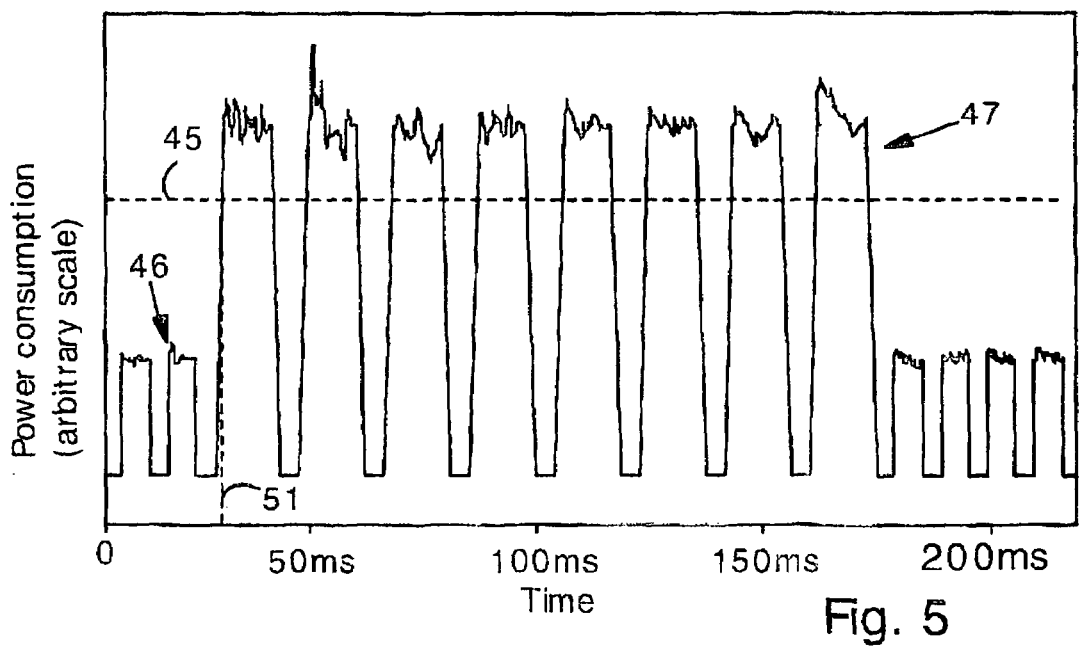
FIG. 5 shows a typical power consumption signal associated with a software attack.

FIG. 5 shows a 200 ms duration plot of a power consumption signal during a software attack. Specifically, FIG. 5 illustrates the power consumption signal in a model Axim 3xi, 400 Mhz personal data assistant (PDA) manufactured by Dell Computer during an Apache web server denial of service attack. The low amplitude waves 46 are produced by normal operating clock cycles of the microprocessor 26 and NIC 24. The higher amplitude waves 47 are a result of the virus controlling the operation of the device.

Discrete software attacks (i.e. non-DOS, non-flooding attacks) typically produce short bursts (e.g., 110-200 ms duration) of higher than normal power consumption. FIG. 5 illustrates such a burst. The burst of FIG. 5 can be detected by establishing a trigger threshold 45. When the trigger threshold level is exceeded (e.g., at time 51), the frequency detector 36 begins to capture the power consumption signal. Preferably, data from the buffer 44 is retrieved so that the power consumption signal prior to time 51 can also be included. For example, 25-100 milliseconds of power consumption signal data prior to time 51 can be provided by the buffer 44. In this way, the frequency detector can analyze the entire plot of FIG. 5, including the portion prior to time 51.

Figure 6:
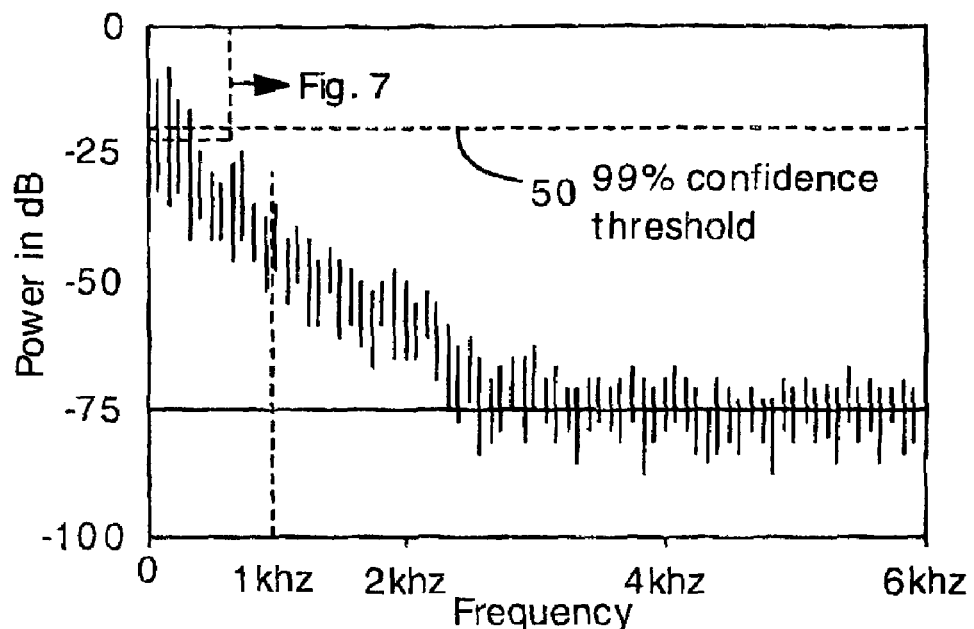
FIG. 6 shows a frequency spectrum plot of the signal of FIG. 5. The plot of FIG. 6 is produced by a Fourier transform of the signal of FIG. 5.

FIG. 6 shows a plot of the frequency spectrum of the power consumption plot of FIG. 5 made against a Dell Axim 3xi 400 Mhz PDA. In the present invention, the frequencies of interest are necessarily frequencies with high amplitudes. The high amplitude frequencies are commonly found at the low frequency end of the spectrum; typically the high amplitude frequencies are below 1 khz. Preferably, the only frequencies analyzed in the present invention have amplitudes greater than a 99% confidence threshold 50 as determined by well-known standard deviation statistical tests (e.g., the Chi squared test, Monte Carlo test, and Fisher distribution or other techniques of using standard deviation statistics). Frequencies with amplitudes greater than the threshold 50 have a 99% chance of being real signals that are not erroneously produced by noise. Although a 99% confidence threshold is preferred, higher (e.g., 99.5% or 99.9%) or lower (98%, 95% or 90%) thresholds can also be used to discriminate against lower amplitude frequencies. There exist many possible techniques and algorithms for extracting the highest amplitude frequency components from the frequency domain data. For example, an algorithm known as the Lomb-Scargle periodogram algorithm can be used. For detailed information about the Lomb-Scargle algorithm, reference can be made to Laguna, P., Moody G B., Mark, R., "Power Spectral Density of Unevenly Sampled Data by Least-Square Analysis," *IEEE Transactions on Biomedical Engineering*, pp. 698-715, 1998.

In the specific example of FIG. 6, four frequencies exist having an amplitude greater than the threshold 50. These frequencies are illustrated in the plot of FIG. 7.

Figure 7:
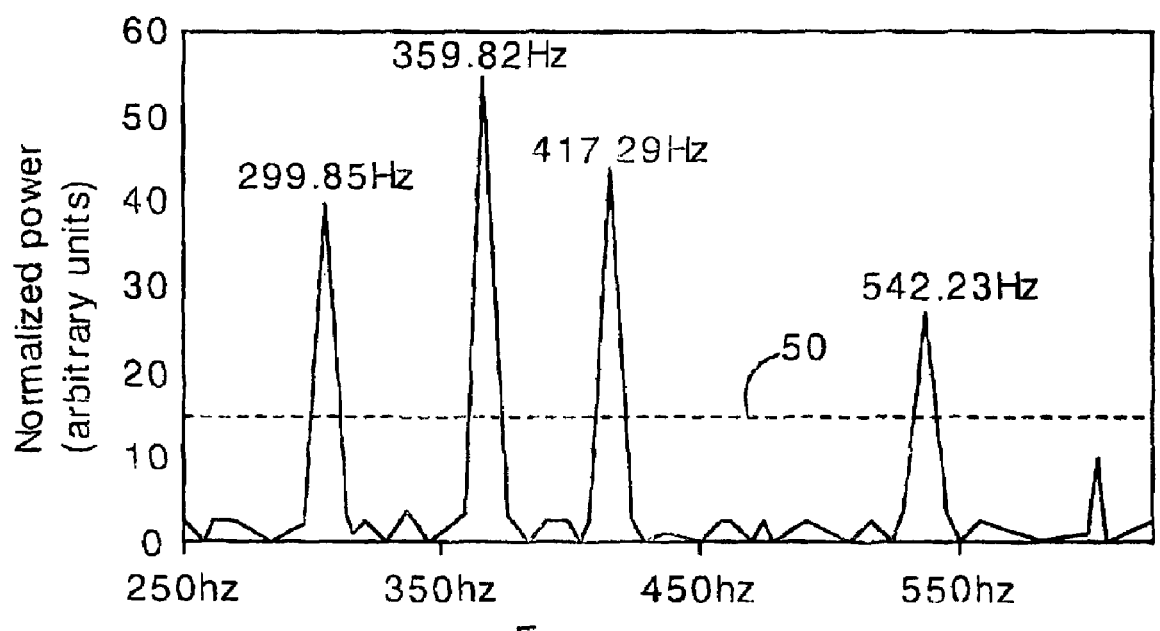
FIG. 7 shows a plot of only the frequency components of FIG. 6 having amplitudes greater than a 99% confidence level.

In FIG. 7, the four frequencies with amplitude greater than threshold 50 are 299.85 Hz, 359.82 Hz, 417.29 Hz, and 542.23 Hz. These four frequency components comprise a frequency signature for the "Apache Web Server Denial of Service Attack" against the Axim 3xi 400 Mhz PDA. These four frequencies will be present in the power consumption signal of this particular electronic device when this attack is active. Hence, whenever these four frequencies are detected at the same time in the Axim 3xi 400 Mhz PDA, one can be confident that the "Apache Web Server Denial of Service Attack" has attacked the device.

It is very important to note that different electronic devices will respond differently to the same software attack, worm or virus. Some devices generally do not produce distinct waves as illustrated in FIG. 5. Different devices can produce completely different frequency signatures when subject to the same attack or virus. Also, the frequency signature can be substantially altered by changing individual hardware components, or by differences in operating software Additionally, it is very important to note that in a single type of device, different software attacks, viruses and worms will produce completely different frequency signatures.

Table 2 below shows exemplary frequency signatures produced when three different software attacks (the Apache Web Server DOS attack, the MS SQL remote UDP exploit, and the Sasser Worm Attack) attack four different PDA devices. Table 2 was generated from power consumption signals at the power supply (i.e., by sensor 30 and not sensors 30a 30b).

TABLE 2

Frequency signatures for selected devices and attacks

| Electronic device model | Apache Web Server DOS attack | MS SQL remote UDP exploit | Sasser Worm Attack |
|---|---|---|---|
| Axim 3xi 400 Mhz PDA (Dell) | 359.82 Hz, 417.29 Hz, 299.85 Hz, 542.23 Hz, 659.67 Hz (Shown in FIG. 7) | 662.17 Hz, 602.2 Hz, 839.58 Hz, 722.145 Hz, 479.732 Hz | 659.67 Hz, 479.76 Hz, 719.64 Hz, 599.7 Hz, 539.73 Hz |
| Axim 5 v 624 Mhz PDA (Dell) | 779.61 Hz, 1381.8 Hz, 3180.9 Hz, 1741.6 Hz, 1019.5 Hz | 299.85 Hz, 3180.9 Hz, 1379.3 Hz, 1741.6 Hz, 3540.7 Hz | 419.79 Hz, 1741.6 Hz, 779.61 Hz, 1379.3 Hz, 2941.15 Hz |
| iPaq 4150 400 Mhz PDA (HP/Compaq) | 1379.3 Hz, 779.61 Hz, 1739.1 Hz, 1139.4 Hz, 2938.5 Hz | 479.76 Hz, 719.64 Hz, 959.52 Hz, 1079.5 Hz, 1319.3 Hz | 479.76 Hz, 719.64 Hz, 956.52 Hz, 599.7 Hz, 779.61 Hz |
| iPaq h5555 400 Mhz PDA (HP/Compaq) | 899.55 Hz, 779.61 Hz, 842.08 Hz, 419.79 Hz, 719.64 Hz | 2461.3 Hz, 1139.4 Hz, 1501.9 Hz, 2823.6 Hz, 2101.4 Hz | 1141.9 Hz, 1256 Hz, 24613 Hz, 2101.4 Hz, 1499.3 Hz |

The frequencies created by software attacks are highly unpredictable across devices and across software attacks. Different devices subjected to the same attack, or the same devices subjected to different attacks, will produce completely different, and unpredictable frequency signatures. However, a specific software attack will produce identical frequency signatures in devices of the same make and model.

For example, all Axim 3xi 400 Mhz PDA devices will produce a frequency signature having high amplitude frequencies at 299.85 Hz, 359.82 Hz, 417.29 Hz, and 542.23 Hz when attacked by the Apache Web Server DOS Attack.

The variability of frequency signatures makes the present frequency spectrum monitoring method difficult to design around or "hack". This design-around difficulty is a strength of the present method. There is no known relationship between software code instructions and the frequency signature. A virus writer or hacker creating a virus will have no way to predict or calculate the frequency signature for a particular virus. The frequency signature can only be determined empirically. Thus, the hacker will have limited or no o ability to circumvent the present monitoring method.

Therefore, in the present frequency spectrum monitoring method, it is essential to empirically determine the frequency signatures for each individual attack, worm or virus in each individual model of electronic device, and store these empirically determined frequency signatures in the database 40. Hence, each model of electronic device will have a unique set of frequency signatures stored in the signature database 40. The frequency signatures in the database 40 will be specific to each type of electronic device. Also, the frequency signatures in the database 40 will need to be updated with new empirical data as new viruses are created.

Also, it is noted that, when individual components (e.g., network interface circuit 24 and/or microprocessor 26) are monitored for frequency signatures associated with software attacks, each component will typically have a unique frequency signature for a single kind of software attack. For this reason, the signature database 40 must contain a frequency signature database for each component that is monitored. For example, the network interface circuit 24 and microprocessor 26 can each have their own associated signature databases.

Additionally, the frequency signatures can include amplitude information for each frequency component. Amplitude information for each frequency component can be included in the frequency signature database. For example, in the specific instance of FIG. 7, the frequency components have the following amplitudes (in arbitrary units):

299.85 Hz, amplitude: 40
359.82 Hz, amplitude: 55
417.29 Hz, amplitude: 43.5
542.23 Hz, amplitude: 27.5

Including amplitude information in the frequency signature makes false positive matches with legitimate application programs less likely. False positive matches are a concern, because legitimate application programs can produce a wide range of varying frequencies as different functions in the application are utilized. Also, multiple application programs operating simultaneously can produce a large assortment of varying frequencies. It is important for frequency signatures to be sufficiently distinctive such that a legitimate program is not incorrectly identified as a software attack.

In the present invention, to avoid false positive matches with legitimate application programs, it is necessary to require that a frequency signature have at least 3 frequency components with high amplitudes (i.e., amplitudes exceeding a predetermined confidence threshold). A frequency signature with only two high amplitude frequencies is generally not distinctive enough, even if amplitude information is included in the frequency signature. In fact, frequency signatures with 3 frequency components can occasionally produce false positive matches, even if amplitude information is included. For very low levels of false positive matches, it is desirable for frequency signatures to have 4 or more frequency components with amplitudes higher than the 99% confidence threshold derived by a standard deviation statistical test, in combination with amplitude data for each frequency component.

If a software attack is detected, there are several options available. For example, the user or microprocessor 26 may decide to activate antivirus software. In this case, the antivirus software can be targeted for the type of virus, worm or software attack detected. Also, the user or network administrator can be notified of an active attack and take appropriate action to prevent propagation of the attack throughout the network. Also, the microprocessor 26 can be programmed to capture the network source port, network destination port (if applicable), IP address, and time of the attack. Ports are electronic addresses associated with a single device. Typically, a single electronic device will have $2^{32}$ source and destination ports. Similarly, the use of network ports can be correlated to processes executing in the microprocessor in order to identify possible abnormal behavior. If an unknown or suspicious process is observed to require large amounts of processor utilization, then that behavior might be caused or influenced by an attack.

It is noted that frequency signatures of software attacks, worms and viruses are typically more easily characterized than frequency signatures of more complex application software programs. Viruses and worms tend to rely on relatively short and simple code instructions with few variations. This tends to result in frequency signatures with fewer and more consistent frequency components. Hence, the present method is particularly well suited for detecting simple code instructions that are commonly found in viruses and worms.

Measurement of frequency components is preferably performed with accuracy and precision. Inconsistent or inaccurate frequency measurement will require loose standards for matching between a detected frequency signature and stored signature in the database 40. Loose matching can produce unacceptably high false positive matches with legitimate software applications. Preferably, frequency components are measured by the frequency detector with an accuracy within 4%, 2%, or 1%, more preferably within 0.5% or 0.1%. Similarly, high accuracy in amplitude measurement is also preferable, with accuracies within 4%, 2% being acceptable for some applications and within 1% or 0.5% being preferred.

The present frequency spectrum monitoring method can be operated continuously, or intermittently. Continuous operation tends to be power consumptive, and so is generally not preferred in battery-powered devices unless protection from software attacks is a high priority.

Line-powered electronic devices can employ continuous monitoring for frequency signatures indicative of software attacks. Line powered devices can separately monitor multiple individual components such as the NIC 24, microprocessor 26 or other components. Separately monitoring individual components for frequency signatures can provide highly reliable and highly specific detection of software attacks.

In battery powered devices, it typically requires too much power to continuously monitor the power consumption signal for frequency signatures. Hence, in battery powered devices, the frequency detector will need to be periodically triggered. The frequency detector may be triggered in response to an indication that the device may be the target of a software attack. For example, the user may manually trigger the frequency detector if the user notices signs of a virus or connects to a network known to be infected. A network administrator may remotely trigger the frequency detector in order to determine the extent of virus contamination in a network. Also, the microprocessor may automatically trigger the frequency detector if other signs of a software attack are detected. For example, the frequency detector can be triggered if excessive power consumption is detected according to the first embodiment of the present invention. Alternatively, the frequency detector can be triggered at timed intervals, or every time a new file is downloaded from a network.

The present frequency spectrum monitoring method is particularly effective in detecting short duration discrete attacks (i.e. non-DOS, non-flooding attacks) that may comprise single or small numbers of 'pings' in the NIC 24 or microprocessor 26. The present method can even detect the mere reception of a software attack by its effect on the NIC 24. When received at the NIC 24, a software attack file produces characteristic frequency components in the power consumption signal at the NIC 24. Of course, it is understood that the frequency spectrum monitoring method can also detect DOS and flooding attacks.

In the future it is expected that portable electronic devices will be equipped with "smart batteries" that include circuitry integrated into the battery itself for precisely monitoring power consumption rates and patterns and reporting the monitor data to the microprocessor or other components in the device (e.g., detectors 32 and 36). Such smart batteries are well suited for use with the present invention because of their ability to capture power consumption signals. For example, smart batteries may have a sensor 30 of FIGS. 1 and 3 integrated into the battery unit itself that accurately detects power or current flowing from the battery. Some smart batteries may also include ADC 42, buffer 44 and frequency detector 36 for digitizing power consumption signals with a relatively high sampling rate (e.g., greater than 5 Khz).

Also, it is noted that the frequency detection and signature comparison functions can be performed remotely. In this aspect of the invention, the raw power consumption signal (in the time domain), and/or the frequency spectrum can be transmitted via the network to a remote server for processing. The remote server can have more detailed and more powerful software than that available on small portable devices (e.g., the remote server can have a more extensive signature database of known software attacks). In this case, the remote server can process the power consumption signals or frequency spectra and inform other network users about the presence of software attacks on the network.

Figure 8:
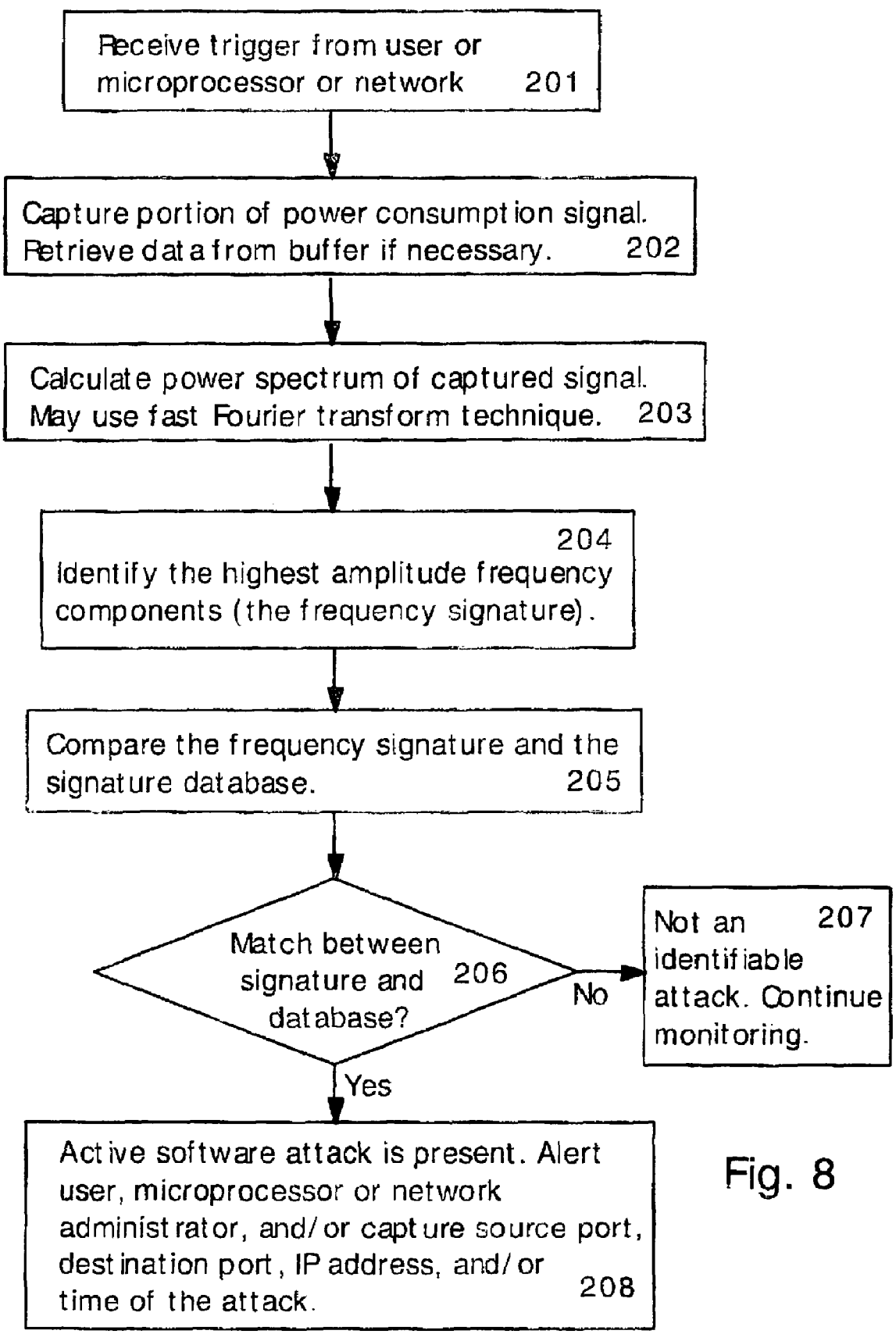
FIG. 8 shows a flow chart illustrating the present frequency spectrum monitoring method.

FIG. 8 shows a flow chart illustrating the present frequency spectrum monitoring method. The steps are described below:

Step 201: a trigger is received that initiates the spectrum monitoring method. In most cases (e.g., particularly in battery powered devices), it is desirable to trigger the frequency detector 36 instead of operating it continuously because the frequency detector consumes a significant amount of electrical power. Triggering can be automatic or manual, and can be in response to indications that a software attack exists in the network or in an individual electronic device.

Step 202: The frequency detector captures a portion of the power consumption signal. Most software attacks produce bursts of power consumption lasting about 100-150 milliseconds. In order to capture an entire burst of power consumption, the frequency detector preferably captures about 200 ms or more of the power consumption signal. The buffer 44 may provide past power consumption data so that the frequency signature can be determined retroactively.

Step 203: the power consumption signal is converted to the frequency domain, preferably by using the fast Fourier transform technique.

Step 204: the frequency components having the highest amplitudes are identified. Preferably, an amplitude threshold is set at a 99% confidence level (i.e. such that there is a 99% confidence that a signal at the threshold is not due to noise).

The high amplitude frequency components comprise the frequency signature. Also, the amplitudes of each frequency component can be measured and included as part of the frequency signature.

Steps 205, 206: the detected frequency signature is compared against a signature database containing signatures for many known software attacks. The signature database should be specific for a type of electronic device. Each electronic device will have a unique database.

Step 207: if a match is not found, then it can be concluded that the power consumption signal captured in step 202 is not identifiable. The device should continue normal monitoring of the power signal.

Step 208: if a match is found in the signature database, then it can be concluded that the power consumption signal captured in step 202 is most likely a known software attack. The software attack can be identified by the frequency signature match. Preferably, the user, microprocessor or network administrator are notified of the presence of the software attack. The network source and destination ports, IP address, and time of the attack can be captured and stored for analysis and tracking of the software attack.

Additionally, other actions can be taken in response to detecting a frequency signature of a known attack. For example, an analysis of microprocessor utilization for each process can be performed. Information about microprocessor utilization can be helpful for determining if an attack is really occurring, and/or identifying the attack. If an unknown or suspicious process is observed to require large amounts of processor utilization, then it might be caused by an attack.

Also, it is noted that an incomplete signature match can be a trigger for further testing or other actions such as warning the user. For example, if a detected frequency signature matches 4 of 5, or 5 of 6 frequency components of a frequency signature of a known attack, then more sophisticated detection software (e.g., antivirus software) can be executed.

Also, it is noted that the frequency signature does not necessarily have to contain all frequency components having amplitudes greater than the confidence threshold. The frequency detector can have a high frequency cutoff above which frequencies are not detected. This may permit the sampling ADC to operate at a lower sampling rate, and the buffer to have a smaller storage capacity, thereby conserving power. However, in this case, the frequency signature must include an adequate number of high amplitude frequency components for confident identification of software attacks. For example, the frequency signature should contain at least 3 (preferably 4 or more) high amplitude frequency components with frequencies below the cutoff frequency.

Power Signature Monitoring

In a third aspect of the present invention, the power consumption signal is monitored in the time domain over an extended period (e.g. 0.5 to 4 seconds or longer). Only long-duration changes in power consumption are analyzed (e.g. by low-pass filtering, or tracking only the voltage peaks of the spikes). When monitored over an extended period (e.g. over 1 second), and in a way that preserves long duration variations and patterns in power consumption, the power consumption signal is understood to be a power consumption signature. The power consumption signature tracks only long duration changes in the power consumption signal and very short duration spikes (e.g. single spikes or groups of spikes lasting 25 or 50 milliseconds or less) are ignored. Analyzing the power consumption signal is this way provides information about the type of protocol (e.g. Transmission Control Protocol (TCP) or Universal Datagram Protocol (UDP)) used in an attack. Power consumption signature monitoring is useful for detecting and identifying the transmission protocol used in a network flooding attack. This is particularly useful in attacks that are so noisy as to overwhelm the detection and identification of frequency signatures.

FIG. 9 illustrates an electronic device capable of detecting undesired software according to the third embodiment of the present invention employing power signature detection. The device includes the power supply 20, the system management bus 22, the network interface circuit (NIC) 24, the microprocessor 26, the antenna 28, the network connector (e.g., Ethernet connector) 29, and sensors 30 30a 30b. A power signature detector 60 receives the power consumption signal from the sensors 30 30a 30b and produces a power signature that ignores very short duration variations and patterns in power consumption. In some embodiments, the power signature detector 60 can function as a low-pass filter, or as a peak detector with a buffer capacity. Also, although not shown, the device can include a buffer (analogous to buffer 44) for storing portions of the power consumption signature, so that the signature can be analyzed retroactively.

A power signature comparator 38b and power signature database 40b are also provided. The power signature database 40b stores power signatures for a variety of communication protocols. Typically each type of communication protocol has a distinctive power signature. The power signature comparator 38b compares power signatures stored in the database 40b with power signatures detected by the detector 60. This can be done on an automated basis using hardware/software/firmware whereby detection of the worm or virus, for example, will be identified by the signature. In alternative embodiments, a network administrator, security expert or other human can provide the functions of the signature comparator 38b and signature database 40b. Power signatures are typically simple, few in number and easy to remember, so a human operator could reliably detect and identify power signatures based on unprocessed (or minimally processed) power signature data. For example, a human operator could determine the type of communication protocol by observing a raw, unprocessed signal from the sensor 30.

Figure 10B:
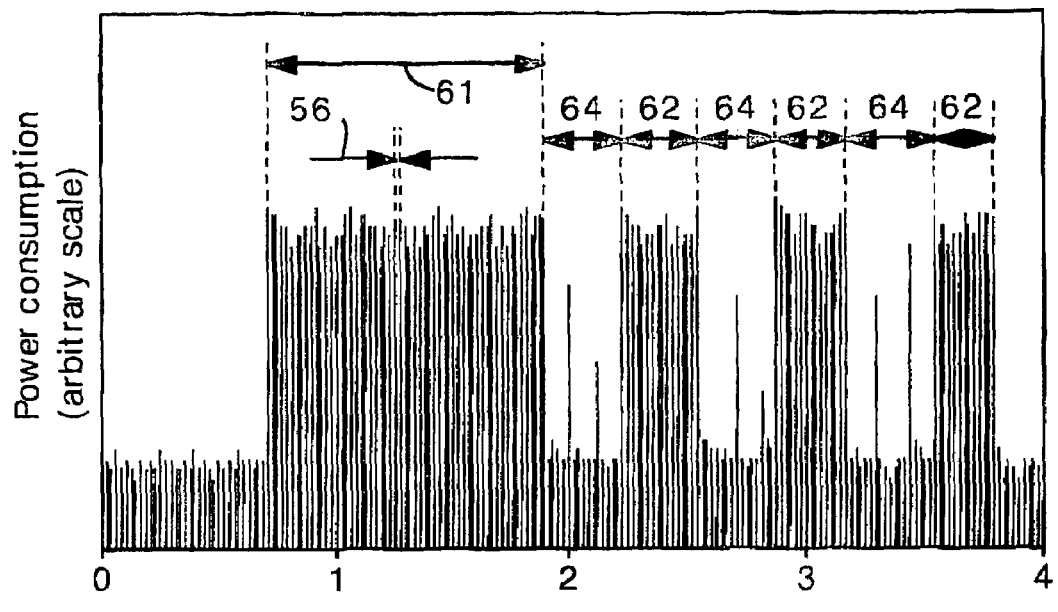

FIGS. 10a and 10b show power consumption signatures for two exemplary attacks on a Dell Computer Axim 3xi 400 Mhz PDA. The power consumption signals were detected at the power source (i.e. at sensor 30, not sensors 30a 30b). The attacks are intense network flooding attacks comprising a large number of data packets and data requests. Network flooding attacks typically persist for an extended period of time (e.g. 1-2 seconds or more), particularly if a large number of machines are involved. Network flooding attacks can persist for a full minute in some circumstances. Network flooding attacks typically produce power consumption signals with closely spaced power consumption spikes. A period 56 between power consumption spikes will typically be in the range of about 1-20 milliseconds, more typically about 7-13 milliseconds By comparison, in the discrete attack of FIG. 5 the power consumption spikes had a period of about 20-25 milliseconds Extremely intense network flooding attacks can be difficult to analyze with respect to frequency components and frequency signatures in the frequency spectrum monitoring method explained above. This is because such attacks tend to produce large amounts of noise that can be difficult to analyze with respect to frequency. Many spurious frequencies are created by the intense activity and frequent phase shifts. The present power signature monitoring method is relatively immune to disturbances from this noise. Consequently, the present power signature monitoring method (i.e. monitoring power consumption patterns over long time scales in the time domain, while disregarding transient changes in power consumption) may be preferred when an intense network flooding attack is occurring.

In the present method, TCP, UDP and other types of network flooding attacks are distinguished by the pattern of high and low amplitude power consumption spikes.

FIG. 10a shows a raw, unprocessed power consumption signature (in the time domain) of a typical TC protocol network flooding attack. The attack has a plateau 58, which is typical of TC protocol attacks. A duration 58 of the plateau is variable, depending on the type of attack and number of machines participating the in the flooding attack. Typically, the plateau duration will be in the range of about 0.5-20 second, or more typically about 2-10 seconds, but it can be longer or shorter. The amplitude of the plateau 59 is also variable and will depend on factors including the type of attack and the type of electronic device being monitored. The amplitude 59 can be used to distinguish TCP attacks from attacks employing other protocols. For example, TCP attacks will typically have a greater power consumption than attacks employing the Internet Control Message (ICM) protocol. The amplitude 59 is an approximate, average value, since the power consumption spikes are typically noisy and have varying amplitudes, as shown.

It is noted that TC protocol attacks can have short duration lulls (e.g. less than 25 ms or 50 ms); the plateau is considered to be continuous even in the case of such short duration lulls. Lulls shorter than 25 or 50 milliseconds are disregarded in the present power signature monitoring method. Such short duration lulls can be caused by network router operations, particularly during busy periods.

FIG. 10b shows a raw, unprocessed power consumption signature (in the time domain) of a typical UD protocol network flooding attack. UDP attacks will typically have an initial plateau followed by a series of alternating shorter plateaus 62 and lulls 64. The initial plateau with duration 61 will typically be longer than the following shorter plateaus 62. Typically, the initial plateau duration 61 will be in the range of about 0.5-2 second, or more typically about 1 second. The entire attack (comprising the initial plateau 61 and subsequent plateaus 62 and lulls 64) can be up to a minute long or longer. The series of shorter plateaus 62 and lulls 64 is characteristic of UD protocol attacks and can be used to distinguish UD protocol attacks from TC protocol attacks and ICM protocol attacks. Typically, the number of short plateaus 62 and lulls 64 will be equal, and can be in the range of about 1-10; most typically, UD protocol attacks will have about 3 short plateaus 62 and 3 lulls 64. The short plateaus 62 and lulls typically will each have durations of about 0.1-1 seconds. UD protocol is a "best effort" protocol and does not require confirmation of communications. UD protocol is essentially guaranteed to have lulls 64. The lulls 64 occur when the device is waiting for a response transmitted over a wireless communication link. TC protocol does not employ this "wait for response step" and so will not have the lulls 64.

Based on the presence or absence of the short plateaus 62 and lulls 64 in power consumption, it is possible to reliably identify the attack as TCP-based or UDP-based. Proper identification of the protocol used in a network attack is useful information for a network administrator, security expert, or computer user. Protocol identification can help a network administrator or security expert track the source of an attack, and choose ports or communications links that should be shut down or monitored for suspicious traffic. Information about the communication protocol can also help a person select the most appropriate type of network security software to defend against the attack.

TC protocol is almost always used for communications over wired links (e.g. Ethernet), and UD protocol is almost always used for communications over wireless links. Therefore, by identifying whether an attack is based on TC protocol or UD protocol, a user can usually determine whether the attack is based on wired or wireless communications.

The present power signature monitoring method can also be used to identify other kinds of protocols used in an intense network flooding attack, such as Internet Control Message Protocol (ICMP), or File Transfer Protocol (FTP). ICM protocol will typically produce a power consumption signature comprising a single plateau as in FIG. 10a, but with an amplitude smaller than amplitude 59 for the TC protocol. Typically, the amplitude of the ICM protocol attack will be about 5-10% lower than the amplitude of a similar TC protocol attack.

The power signature comparator 38b and power signature database 40b can be programmed to recognize the short plateaus 62 and lulls 64. The microprocessor 26 can then inform the computer user of the type of protocol (e.g. TCP or UDP) used in a present network attack.

Alternatively, in another aspect of the present invention, the detector 60, comparator 38b, and database 40b are not present. In this case, a user, network administrator, security expert, or other human operator has access to the signal directly from the sensor 30 or sensors 30a 30b. The human operator can control the time scale and amplitude scale and smoothing (e.g. low-pass filtering) of the power consumption signal as desired to enable recognition of the type of communication protocol used in an attack.

Figure 11:
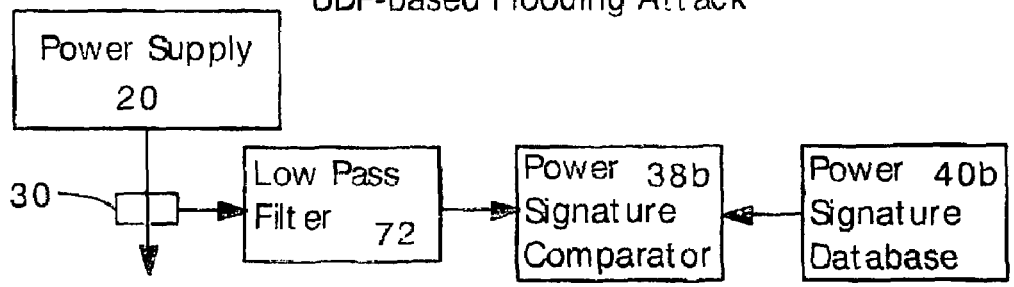
FIG. 11 shows alternative circuitry for detecting a power consumption signature. The low pass filter allows the circuit to capture only long-term variations in the power consumption.
Figure 12:
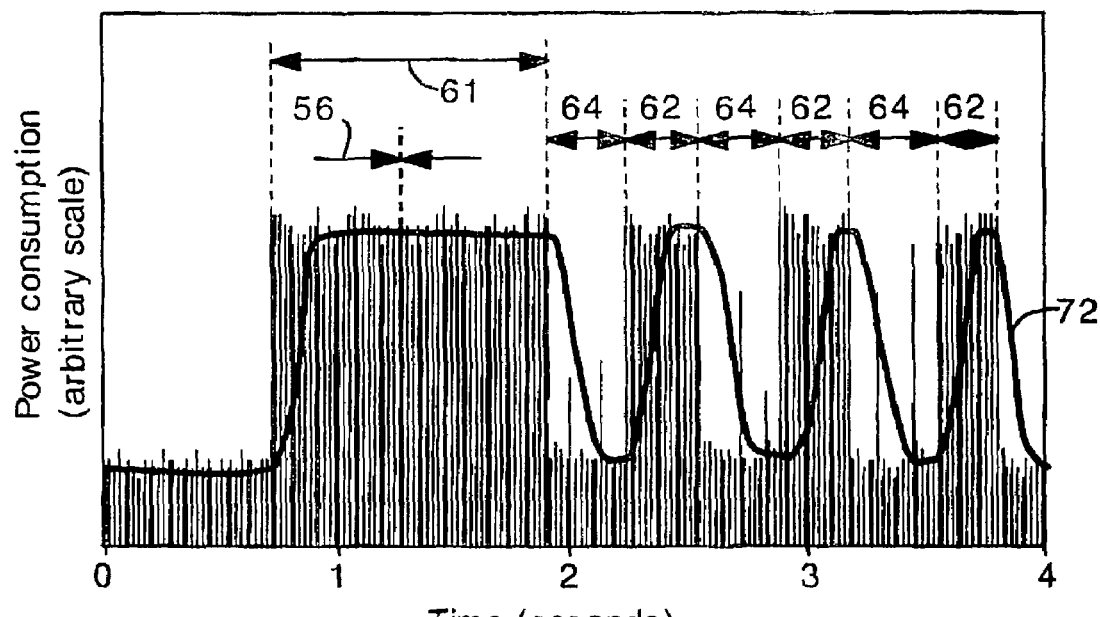
FIG. 12 shows a power consumption signature with a signal from the low pass filter superimposed.

FIG. 11 shows alternative circuitry for detecting a power consumption signature. The device includes a low pass filter 72 that smoothes the signal from the sensor 30a. The low pass filter 72 causes the circuit to respond to only long-duration variations in the power consumption. Alternatively, the computer user or network administrator can view signals directly from the low-pass filter 72. The low pass filter can be implemented as hardware (e.g. a resistor-capacitor circuit) or software. FIG. 12, for example, shows the UD protocol power signature with a low-pass filtered signal 72 superimposed. The signal 72 from the low-pass filter retains all the information necessary for distinguishing the type of protocol used in the attack. The short plateaus 62 and lulls 64 are present in the low-pass filtered signal.

It is noted that smoothing the power consumption signal or smoothing the power consumption signature is optional in the invention. The power consumption signature can be a raw unprocessed signal (e.g. as in FIGS. 10a and 10b), or can be a signal smoothed by low-pass filtering or other techniques. Typically, most people trained and experienced with the present invention will be able to recognize the type of communication protocol from only the raw unprocessed signal from the sensor 30 or sensors 30a 30b.

Figure 13:
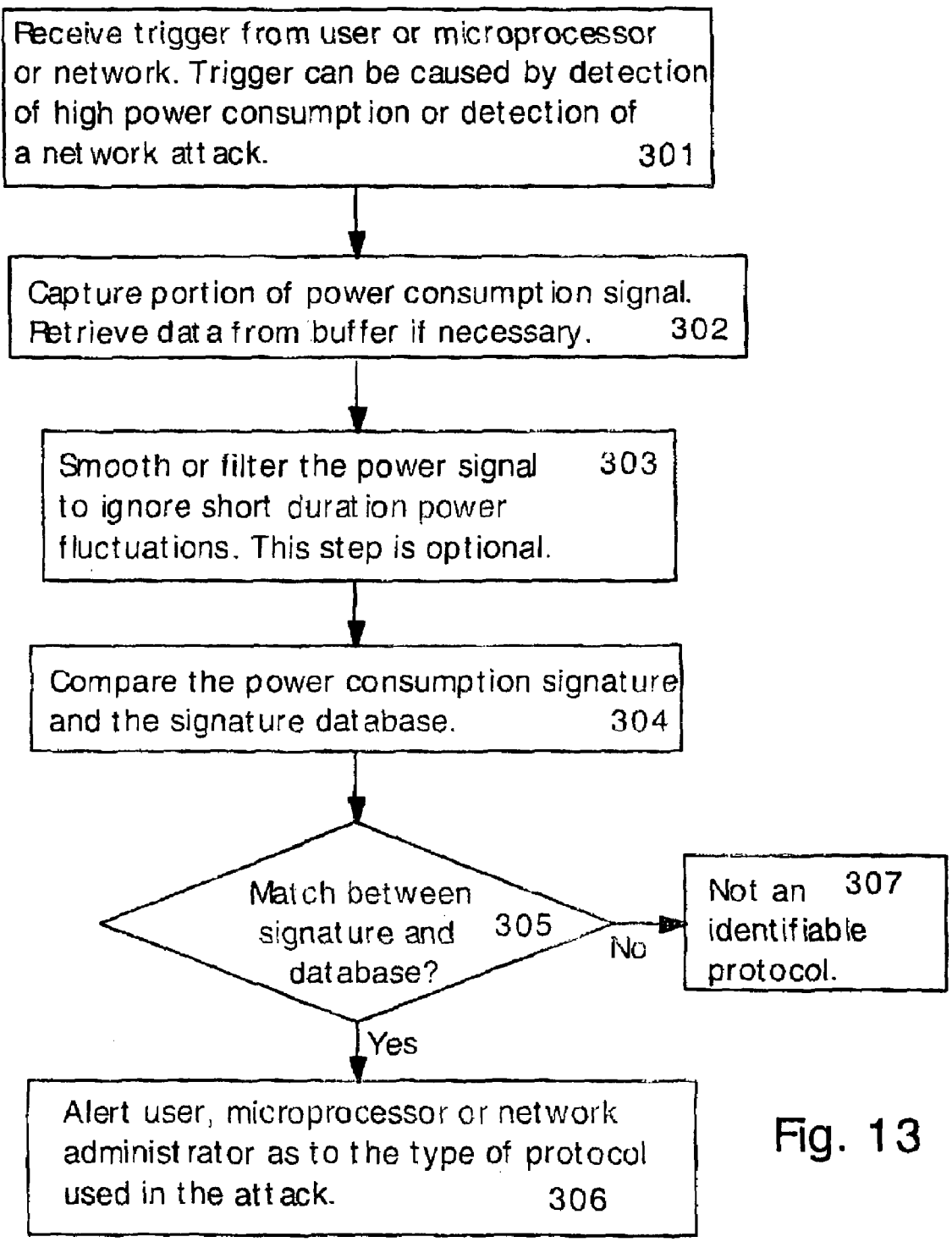
FIG. 13 shows a flow chart illustrating the present power consumption signature monitoring method.

FIG. 13 shows a flow chart illustrating the present power consumption signature monitoring method. The steps are described below.

Step 301: a trigger is received that causes a user or microprocessor to initiate the present method. The power consumption signature is detected. The power consumption signature can be detected when excessive power consumption is detected, or when other signs of a network flooding attack are detected. Also, the user can initiate the present method whenever identification of the communication protocol is desired.

Step 302: The power consumption signature is captured. Data may be retrieved from the buffer 44. In the present method, the buffer may store several seconds of data representing the power consumption signal or signature.

Step 303: Optionally, the power consumption signal is smoothed or processed to eliminate short duration variations in power consumption. Low-pass filtering may be used to provide smoothing. Also, software or hardware may be provided to track only the peaks of the power consumption spikes.

Step 304/305: The power consumption signature is compared with a database of power consumption signatures. The database associates each stored power consumption signature with a type of communication protocol. The database thereby allows the identification of the type of protocol from the power consumption signature. The comparison can be performed manually, or performed by a computer. If performed manually, then the database can comprise printed reference materials.

Step 306: If a match between the detected power consumption signature and a database entry is found, then the type of communication protocol is identified. The user or microprocessor is notified. If it is known that a network flooding attack is present, then appropriate action can be taken by the user, network administrator or microprocessor. For example, the microprocessor can be programmed to take certain defensive actions specific to the type of communication protocol.

Step 307: The type of communication protocol is not identified. Other techniques for communication protocol identification can be used.

Although the present invention has been described primarily for use in portable electronic devices, the present invention is equally applicable to non-portable electronic devices such as personal computers. In non-portable devices, where space and power consumption are less limited, the power consumption signal for each individual component (e.g., NIC 24, microprocessor 26) can be independently monitored. Independent monitoring of discrete components can provide detailed information about the propagation of software attacks through a computer system or network. Also, multiple monitoring locations can provide more data regarding the attack and thereby help to identify the attack with higher confidence.

Also, using any of the three methods described above, it may be possible to detect (separately or in combination) both downloading and operation (execution) of the undesirable software. For example, downloading software will typically produce characteristic patterns of power consumption in the network interface card 24. Operation or execution of software will typically produce characteristic patterns of power consumption in the microprocessor 26. Detecting power consumption in the network interface card 24 and microprocessor 26 individually (e.g. by using sensors 30a 30b instead of sensor 30) may allow for more accurate determination of whether software is being down loaded or executed. Alternatively, analysis of the frequency signature can indicate whether software is being downloaded or executed. For example, certain frequency components may be associated with software downloading, and other frequency components associated with software execution.

It will be clear to one skilled in the art that the above embodiment may be altered in many ways without departing from the scope of the invention. Accordingly, the scope of the invention should be determined by the following claims and their legal equivalents.

What is claimed is:

1. An information processing electronic device capable of protecting a mobile, battery-powered device from malicious software attacks, comprising:

a) a sensor for detecting an amount of electrical power or current consumed by the mobile, battery-powered device;

b) a threshold detector for comparing the detected electrical power or current to a threshold value, and for indicating that undesired software may be present on the mobile, battery-powered device when the threshold value is exceeded.

2. The electronic device of claim 1, further comprising a network interface circuit (NIC), and a microprocessor (MP), wherein the sensor detects an amount of electrical power or current consumed by the NIC and the MP.

3. The electronic device of claim 2, wherein the sensor can detect an amount of electrical power or current consumed by the NIC or MP individually.

4. A method for detecting a malicious software attack in a mobile, battery-powered device, the method comprising the steps of:

a) detecting an amount of electrical power or current consumed by the mobile, battery-powered device;

b) comparing the detected electrical power or current to a threshold value, and c) indicating that undesired software may be present on the mobile, battery-powered device when the threshold value is exceeded.

5. The method of claim 4, wherein if the detected power or current exceeds the threshold value in step (b), then alerting a user or microprocessor or network administrator that undesired software is or might be present.

6. The method of claim 4, wherein step (b) is performed periodically.

7. The method of claim 6, wherein, if the detected power or current exceeds the threshold value in a plurality of consecutive measurements, then indicating to a user or microprocessor that undesired software may be operating.

8. The method of claim 4, wherein the mobile, battery-powered device includes a network interface circuit or microprocessor.

9. The method of claim 4, further comprising the step of adjusting the threshold value according to an operating mode of the mobile, battery-powered device.

10. An information processing electronic device capable of detecting undesired software, the electronic device comprising:

a) a sensor for detecting a power consumption signal representing power or current consumed by the electronic device;

b) a detector for detecting a frequency signature of the power consumption signal; and c) a comparator for comparing the detected frequency signature to a database of frequency signatures associated with undesired software.

11. The electronic device of claim 10, further comprising a buffer for temporarily storing the power consumption signal from the sensor, such that the detector can retroactively determine a frequency signature of recent power consumption.

12. The electronic device of claim 10, wherein the frequency signature includes amplitude information.

13. The electronic device of claim 10, further comprising a network interface circuit (NIC), and a microprocessor (MP), wherein the detector detects a frequency signature of the NIC or MP individually.

14. The electronic device of claim 10, wherein the detector and comparator are implemented as software, firmware or hardware.

15. A method for detecting undesired software in an information processing electronic device, the method comprising the steps of:

a) detecting a frequency signature of a power consumption signal representing electrical power or current consumed by the electronic device; and b) comparing the detected frequency signature to a database of frequency signatures associated with undesired software.

16. The method of claim 15, wherein if a match is found in step (b), then alerting a user or microprocessor or network administrator that undesired software is or might be present.

17. The method of claim 15, wherein the frequency signatures include amplitude information.

18. The method of claim 15, wherein the detecting step includes the step of discriminating against all frequencies having amplitudes less than a predetermined confidence threshold.

19. The method of claim 15, wherein each frequency signature includes at least 3 frequency components.

20. The method of claim 15, further comprising the step of identifying a type of undesired software that may be operating based on a match between the detected frequency signature and a matching frequency signature stored in the database.

21. The method of claim 15, wherein the electronic device comprises a network interface circuit (NIC), and a microprocessor (MP), and wherein frequency signatures of the NIC or MP are detected individually.

22. An information processing electronic device capable of identifying a type of communication protocol used by undesired software, the electronic device comprising:

a) a sensor for detecting a power consumption signature representing power or current consumed by the electronic device;

b) a database including:
   i) data associating a Transmission Control (TC) protocol with a power consumption signature having a single continuous plateau; and
   ii) data associating a Universal Datagram (UD) protocol with a power consumption signature having an initial plateau followed by at least one short plateau and at least one lull; and c) a comparator for comparing the detected power consumption signature to a power signature database, wherein the database associates power consumption signatures with types of communication protocols.

23. The electronic device of claim 22, further comprising a means for smoothing the power consumption signature.

24. The electronic device of claim 22, further comprising a network interface circuit (NIC), and a microprocessor (MP), wherein the sensor detects a power consumption signature of the NIC or MP individually.

25. A method for identifying a type of communication protocol active in an information processing electronic device, the method comprising the steps of:

a) detecting a power consumption signature of electrical power or current consumed by the electronic device;

b) comparing the detected power consumption signature to a database associating power consumption signatures with types of communication protocols; and c) identifying the communication protocol as a Universal Datagram (UD) protocol if the power consumption signal includes an initial plateau followed by a plurality of alternating short plateaus and lulls.

26. The method of claim 25, wherein the detecting step includes the step of smoothing the power consumption signature.

27. The method of claim 25, wherein if a match is found in step (b), then alerting a user or microprocessor or network administrator of the type of communication protocol.

28. The method of claim 25, wherein step (b) is performed manually.

29. A method for identifying a type of communication protocol active in an information processing electronic device, the method comprising the steps of:
- a) detecting a power consumption signature of electrical power or current consumed by the electronic device;
- b) comparing the detected power consumption signature to a database associating power consumption signatures with types of communication protocols; and
- c) identifying the communication protocol as a Transmission Control (TC) protocol or Internet Control Message protocol if the power consumption signal consists of a single continuous plateau.

30. The method of claim 29, wherein if a match is found in step (b), then alerting a user or microprocessor or network administrator of the type of communication protocol.

31. The method of claim 29, wherein step (b) is performed manually.

32. The method of claim 29, wherein the detecting step includes the step of smoothing the power consumption signature.

* * * * *